Dec. 12, 1944. W. A. RAY 2,364,659
CONTROL DEVICE
Filed May 5, 1942 3 Sheets-Sheet 1

Dec. 12, 1944. W. A. RAY 2,364,659
CONTROL DEVICE
Filed May 5, 1942 3 Sheets-Sheet 2

Inventor,
WILLIAM A. RAY
By John H. Rouse,
Attorney

Dec. 12, 1944.  W. A. RAY  2,364,659
CONTROL DEVICE
Filed May 5, 1942  3 Sheets-Sheet 3

Inventor.
WILLIAM A. RAY

John H. Rouse,
Attorney

Patented Dec. 12, 1944

2,364,659

UNITED STATES PATENT OFFICE 2,364,659

CONTROL DEVICE

William A. Ray, Los Angeles, Calif.

Application May 5, 1942, Serial No. 441,773

2 Claims. (Cl. 297—8)

My present invention relates to control devices and more particularly to means for controlling the operation of a reversible motor for positioning a member in accordance with variations in a controlling condition.

An object of this invention is to provide means, for so controlling such a motor, which are simple and compact and which comprise essentially a pair of pivoted levers, one of which is pivoted on the other at a point thereon spaced from its pivot.

Another object is the provision of a novel valve arrangement, for controlling a reversible fluid pressure motor, which is particularly adapted for actuation by the control means mentioned in the preceding object.

Another object is the provision of a valve structure, for controlling fluid flow to and from a fluid pressure motor, wherein means are provided for conducting the return fluid around the valve operating means to cool and/or lubricate the same.

Another object is the provision of means for preventing the building up of fluid pressure between the interconnecting surfaces of parts of a valve, between which surfaces there is a connection for a passage for pressure fluid, in the event of leakage at or rupture of said connection.

Another object is the provision of a tubular thermostatic unit, of the liquid-charged type, wherein means are provided for effectively conducting heat from the exposed surfaces of the unit to the liquid therein.

Another object is the provision, in apparatus of the character described in the first above-stated object, of independent means for "overriding" the operation of the lever system in case of emergency.

Other objects and advantages of my invention will be found in the description, the drawings, and the appended claims; and for complete understanding of the invention, reference should be had to the following detailed description, and accompanying drawings, wherein:

Figure 1a is a fragmentary sectional view of the upper portion of the valve illustrated in Fig. 1, showing details of my improved thermostatic unit;

Fig. 1b is a view, similar to that of Fig. 1a, showing a modified form of thermostatic unit;

Figure 1:
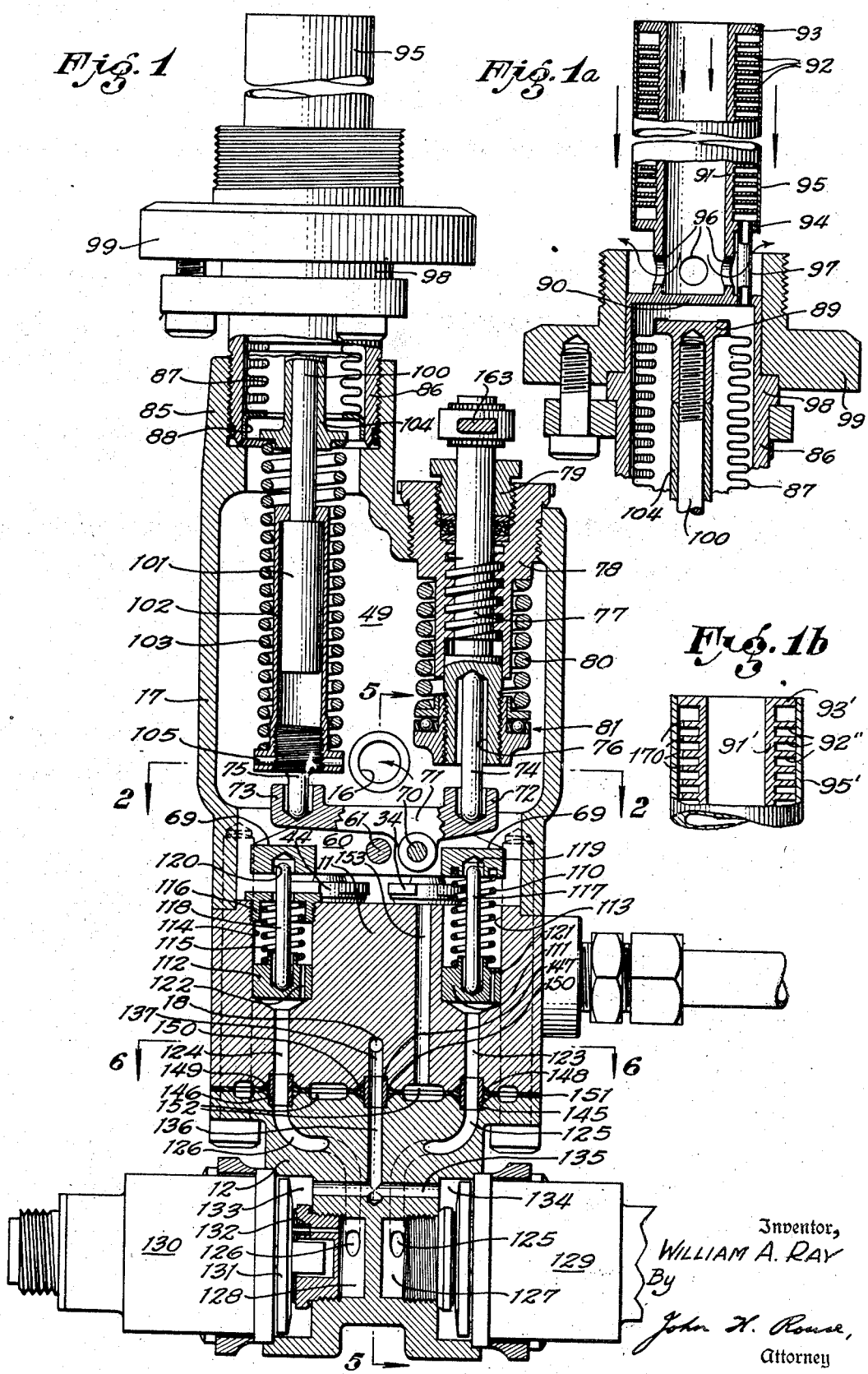
Figure 1 is a view, mainly in central vertical section, of a valve embodying my invention.
Figure 2:
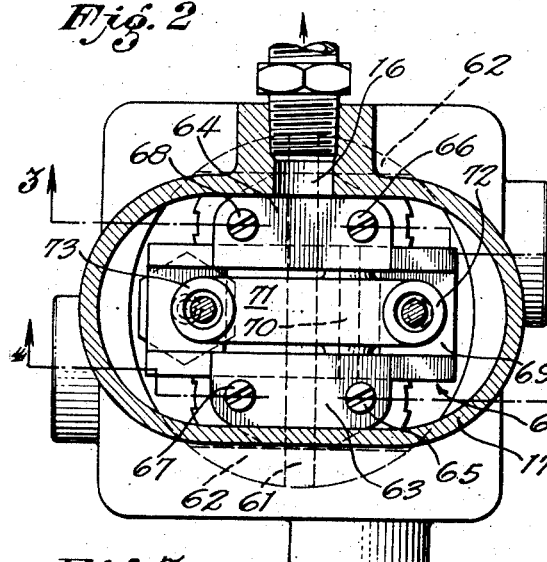
Figure 2 is a transverse section taken along the line 2—2 of Fig. 1.
Figure 5:
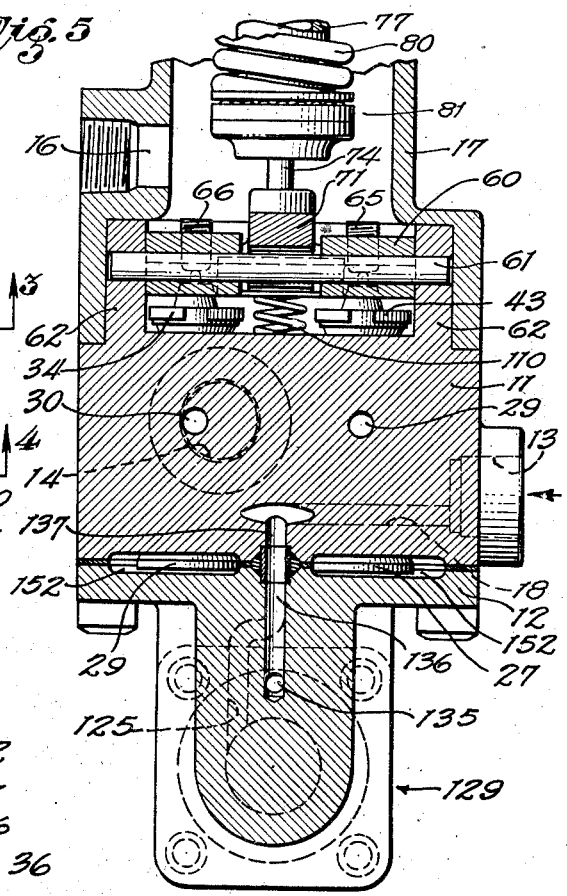
Figure 3:
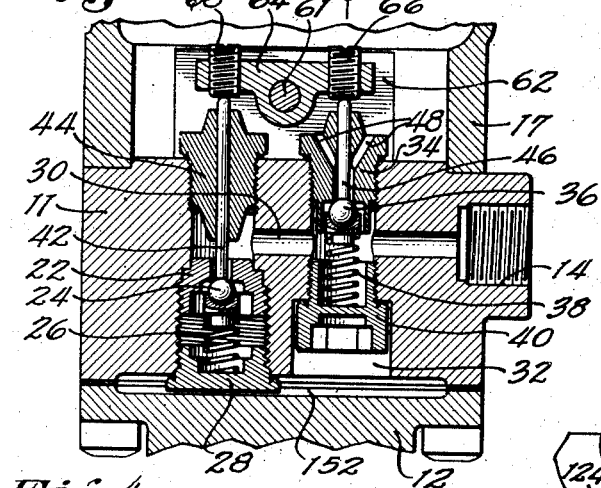
Figure 4:
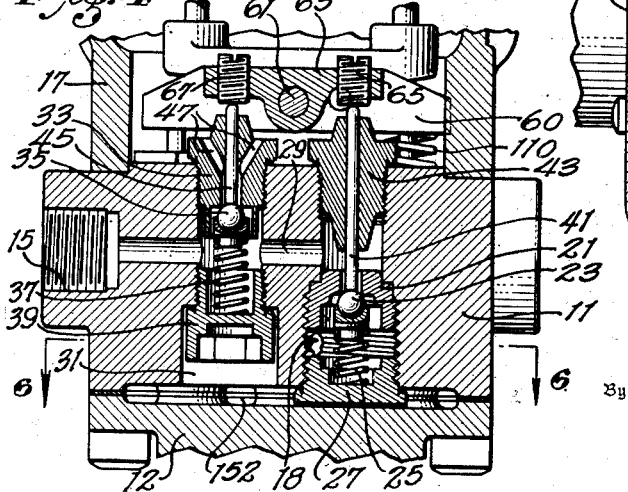
Figure 6:
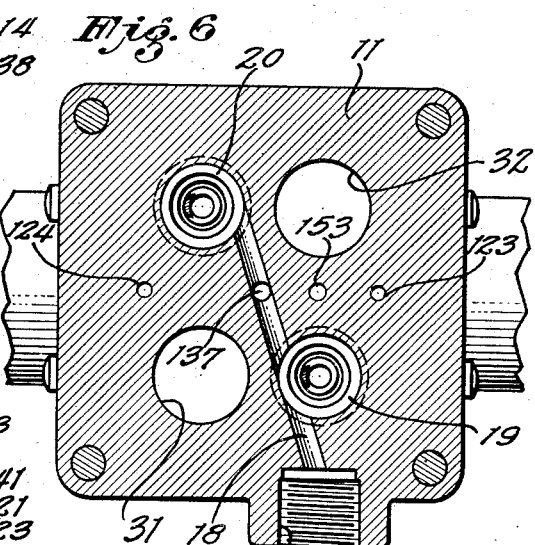
Figure 8:
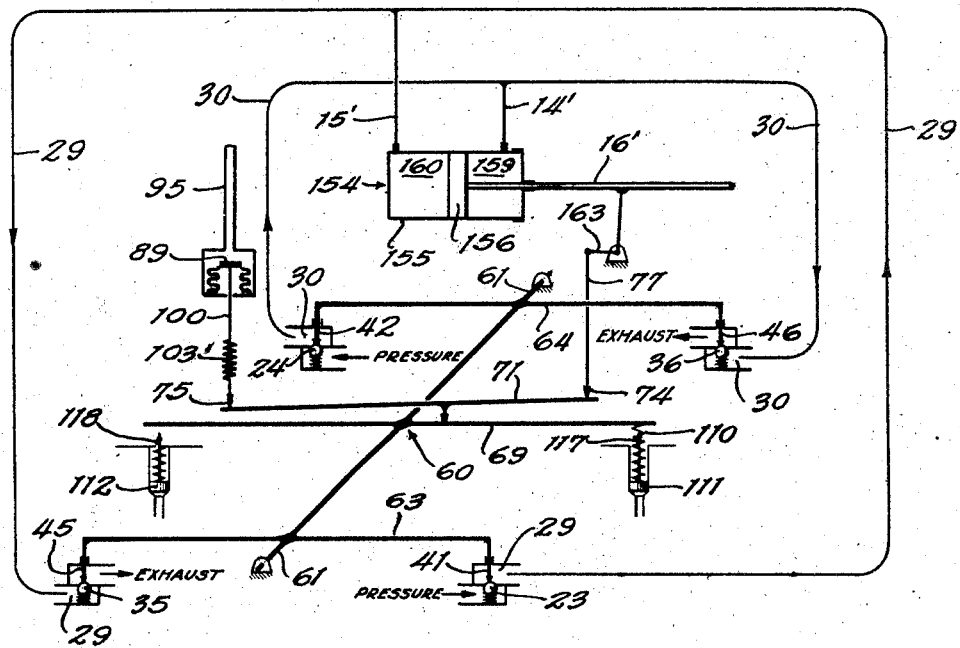
Figure 7:
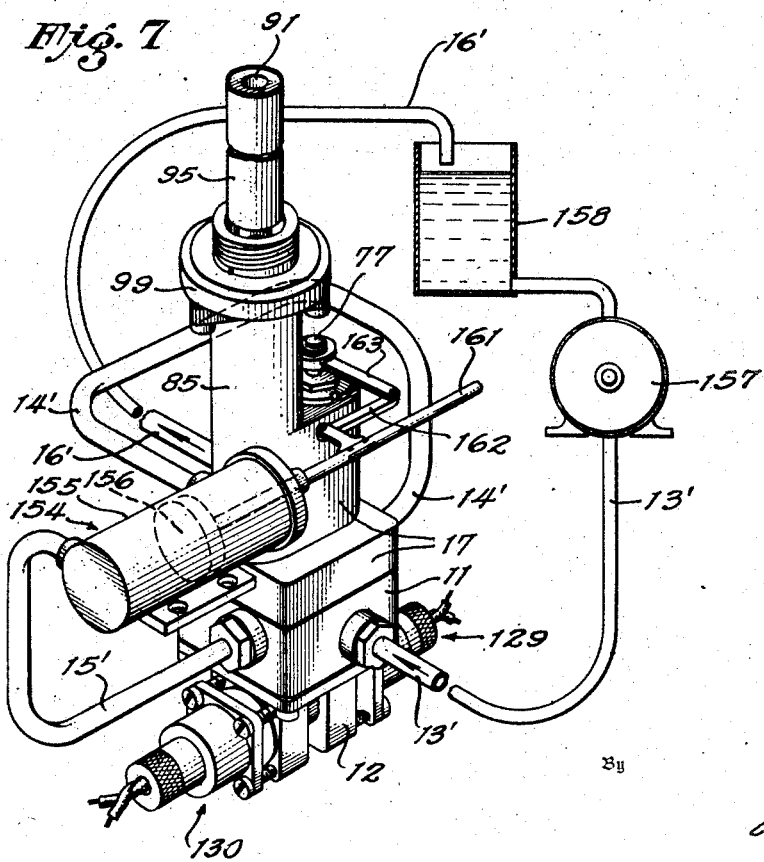

Figures 3 and 4 are fragmentary vertical sections taken along the lines 3—3 and 4—4, respectively, of Fig. 2;

Figure 5 is a fragmentary vertical section taken along the line 5—5 of Fig. 1;

Figure 6 is a lower transverse section taken along the line 6—6 of Figs. 1 and 4;

Figure 7 is a view, in perspective, of the valve illustrated in the other figures, the valve being shown connected in a conventional fluid pressure motor system, illustrated more or less diagrammatically; and Figure 8 is a diagram for facilitating explanation of the operation of the valve, illustrated in the other figures, in the control of a fluid pressure motor.

In the drawings, the numeral 11 indicates the main base portion of the valve, below which is a sub-base section 12 which includes supplemental means for operating the valve, which means will hereinafter be described and need not now be considered in connection with the description of the main, or automatically-operated, parts of the valve, since these supplemental means constitute an "overriding" control system which is operated only in case of emergency.

The valve base 11 has an inlet opening 13 (Figs. 5 and 6) for connection to a source of fluid under pressure, and a pair of openings 14 and 15 (Figs. 3 and 4, respectively) through each of which the fluid can pass to and from chambers of the fluid pressure motor under control; the low-pressure fluid discharged from the motor finally passing through an opening 16 (Figs. 1 and 2) in a valve housing 17, attached to the top of the base 11, in a manner to be described hereinafter.

As seen in Fig. 6, the high-pressure inlet opening 13 communicates with a passage 18 which extends horizontally across the base, breaking into a vertical opening 19 (see also Fig. 4), and terminating at another vertical opening 20. Threaded in the opening 19, above the intersection of passage 18, is a valve-seat member 21 (Fig. 4); and similarly located in the opening 20 is another valve-seat member 22 (Fig. 3). Cooperable respectively with seats formed at the inner upper ends of these members are balls 23 and 24, which are respectively urged toward seating position by springs 25 and 26 compressed against caps 27 and 28 closing the respective bottom ends of the openings 19 and 20. The outlet of the seat member 21 leads into a horizontal passage 29 (Fig. 4) terminating at the opening 15, and the outlet of seat member 22 similarly leads into another horizontal passage 30 (Fig. 3) terminating at opening 14. Branching respectively from the passages 29 and 30 are vertical openings 31 and 32 (Fig. 6), in the upper ends of which are respectively threaded valve-seat members 33 and 34, having, each respectively, ball-shaped closure members 35 and 36 which are urged into seating position by springs 37 and 38 compressed against plug fittings 39 and 40 which close the respective bottom ends of the openings 31 and 32 below the horizontal passages 29 and 30.

For actuation of the ball closures 23 and 24, which control passage of the pressure fluid, reciprocable valve stems 41 and 42 are provided which are closely guided in fittings 43 and 44 threaded in the ends of openings 19 and 20 above passages 29 and 30, each respectively. In a similar manner, the ball closures 35 and 36, which control passage of the exhaust fluid, are arranged to be actuated respectively by valve stems 45 and 46, guided in the extreme upper reduced portions of the bores of their respective seat members 33 and 34. The stems 45 and 46 are clearanced from the lower walls of the bores so that, when the closures are opened, fluid can pass around the stems and through branch passages 47 and 48, respectively, which lead from the bores to the area 49 above the base member 11 within the housing 17. As so far described, it will be seen that when closure 23 only is open, pressure fluid can pass from the inlet 13 to the opening 15, and that when closure 35 only is open, exhaust fluid can pass from opening 15 to the area 49. Similarly, when closure 24 is open, pressure fluid can pass from the inlet 13 to the opening 14, and when closure 36 is open, exhaust fluid can pass from opening 14 to the area 49.

Arranged above the base member 11 are means movable in one direction to simultaneously open closures 23 and 36, and in another direction to simultaneously open closures 24 and 35; the means having an intermediate position wherein none of the closures are open. These means comprise a lever 60 which is pivoted on a pin 61, the opposite ends of the pin being supported in openings in portions 62 (Fig. 6) of the base member 11 which extend from its top surface at the front and rear as viewed in Fig. 1. As best seen in Fig. 2, the upper surface of the lever 60 is centrally channelled in the direction of its length, there being a rectangular opening downward through the middle of the channelled portion 69. Extending medially from opposite sides of the lever are portions 63 and 64, through which are threaded screws 65, 66, 67 and 68, the bottom ends of which are adapted to engage the top ends of the valve stems 41, 46, 45 and 42, respectively, when the lever is rocked; the screws being so adjusted that there is a minute clearance between each of them and its respective valve stem when the lever is in its neutral position, as shown.

Pivotally mounted in the channel of lever 60, by a pin 70 which extends into openings in the walls on either side of the channelled portion 69 and at the right of pin 61, is another lever 71. This lever, as is best seen in Fig. 1, has at its opposite ends upwardly extending bosses 72 and 73 which are recessed to freely receive the pin portions 74 and 75, respectively, of means for automatically operating the lever system. The upper portion of pin 74 extends freely into an axial recess 76 formed in the cylindrical bottom end portion of a screw 77 which is threaded in an elongated nut member 78, which in turn is threaded in an opening through a top wall of the housing 17. The pin 74 serves as a stop, adjustable in position by screw 77, for limiting counter-clockwise rotation of lever 71. Leakage around the cylindrical upper end portion of screw 77 is prevented by a gland nut 79; and lost-motion between the screw and its nut member 78 is prevented by a stiff spring 80 compressed between the nut and a ball-bearing abutment 81 secured to the lower end portion of the screw 77.

The other pin 75 is attached to means for rocking the lever system in response to changes in a controlling condition—the condition in the example illustrated being that of temperature. Threadedly mounted in an opening in an upper extension 85 of the housing 17 is a tubular member 86, within which is an expansible-contractible metallic bellows 87 which is sealingly secured at its bottom end to the member 86 through the medium of a shell 88, and at its top end to a head 89 (Fig. 1a). The end of the tubular member 86 above the head 89 is closed, by a wall 90, to constitute the space between it and the bellows a pressure chamber.

Extending from the wall 90 is a thermostatic unit, of the liquid-charged type, which comprises an elongated hollow cylinder 91, integrally joined at its lower end to the wall 90 and having a relatively thick circumferential wall which is machined or otherwise formed to provide a plurality of spaced fins 92 and end plates 93 and 94. Surrounding the cylinder, and sealingly secured as by solder to the end plates 93 and 94, is a barrel 95, the fins 92 being preferably in close engagement with the barrel at their peripheries. As shown in Fig. 1a of the drawings, the fins are formed as a continuous helix so that the space between the cylinder and the barrel is divided by them into an elongated helical passage. However, if preferred, there may be provided instead (and as shown in Fig. 1b, wherein the numerals assigned to the parts corresponding to those of Fig. 1a are primed) a series of individual fins 92″ which divide the space within the thermostatic unit into spaced annular compartments, the fins then being provided with small openings 170 through which the liquid, with which the unit is charged, can pass between the compartments. It will be seen that, by the arrangements described, there is very effective transfer of heat to the liquid, both from the inside and from the outside of the unit, through the fins—the parts, of course, being made of metal having good heat-conducting properties. In the lower portion of the cylinder 91, below the plate 94, are openings 96 whereby the fluid circumambient to the unit can circulate through its central passageway. The interior of the thermostatic unit is connected with the pressure chamber above the bellows 87 by a pipe 97 sealed at its ends in openings through the plate 94 and the wall 90. Clamped to an enlargement 98 formed on the tubular member 86 at its upper end is a flange 99 whereby the valve may be mounted on a supporting wall, for instance, that of the liquid tank or reservoir of a liquid-cooled airplane engine, the thermal unit then extending through an opening in the wall of the tank so that it is subjected to the temperature of the liquid therein.

Threaded in the thickened bottom end portion of the bellows head 89 is a stem 100 having an enlarged and elongated lower end portion 101 which is a free fit within a hollow cylinder 102. The shoulder at the top of the enlarged stem portion 101 is normally retained in engagement with the top end wall of the cylinder 102 by a spring 103 encircling the cylinder and compressed between the enlarged bottom end portion of the cylinder and the underside of the flanged bottom end portion of a sleeve 104, which surrounds an upper portion of the stem 100 and abuts the head 89. Threaded in the bottom end of the cylinder, and locked in adjusted position by a pin 105, is the pin member 75. The spring 103 serves as an overload "strain-release" and is so stiff that in normal operation of the valve there is no relative movement between the stem and the cylinder, so that vertical movement of the bellows head 89, due to change of pressure thereon produced by temperature change in the thermal unit, effects corresponding movement of pin 75. The lever 71 is urged upwardly into engagement with the pins 74 and 75, through its pivotal connection with the lever 60, by a compression spring 110 acting on the underside of the right-hand channelled end portion 69 of lever 60. It will thus be seen that upward or downward movement of the pin 75 rocks lever 60 about its pivot 61 (pin 74 acting as a fulcrum for lever 71) and thereby effects actuation of the valve closures 24, 35 and 23, 36. When the movement of pin 75 is upward, closures 24 and 35 are opened, and when its movement is downward, the other pair of closures 23 and 36 are opened. It will be noted that if pins 74 and 75 were positively connected to lever 71 (instead of merely being in one-sided engagement therewith) spring 110 would not be essential. However, the arrangement illustrated is preferred, since thereby the possibility of lost-motion between the parts is eliminated.

As was mentioned at the beginning of the description, the sub-base section 12 includes supplemental means, under manual control, for "overriding" the automatic operation of the valve in case of emergency, as, for instance, in case for some reason the thermal unit ceased to function properly. These supplemental means serve to control fluid-pressure operable means provided in base 12 and which comprise a pair of pistons 111 and 112 which work independently in bores 113 and 114, respectively, formed in the top surface of base 12. The piston 111 provides a lower abutment for the lever spring 110, that spring also normally serving to retain the piston in its depressed position. The piston 112 is similarly downwardly urged by a spring 115 which at its upper end abuts a bushing 116 threaded in the upper end of bore 114. Resting in cavities formed in the top surfaces of the pistons 111 and 112 are pins 117 and 118, respectively, the upper portions of which extend outwardly of the piston bores and are adapted to engage the underside of the opposite ends of the channelled portion 69 of lever 60 when the pistons are raised; cavities 119 and 120 being provided in these portions for receiving and loosely guiding the pins, which pins are of such length that they do not impede movement of lever 60 in the normal automatic operation of the valve. The pistons are provided with restricted openings 121 and 122 through which the fluid trapped beneath them can bleed when, after operation, they are returned to their normal depressed positions by the force of springs 110 and 115.

For operating the pistons 111 and 112, means are provided whereby pressure fluid can be selectively supplied to the areas beneath them. For this purpose, the bottom ends of the piston bores 113 and 114 are connected by passages 123 and 124, in base 11, and registering cored passages 125 and 126, in the sub-base 12, with the outlets 127 and 128 of a pair of electromagnetically operated valves 129 and 130, each respectively. These valves are preferably, and as illustrated, of the type disclosed and claimed in my copending application, Serial No. 429,983, filed February 9, 1942, and each comprises (as shown in connection with valve 130) a disk-shaped closure member 131, normally biased into seating engagement with a jet or seat member 132 through which, when the disk is lifted upon energization of the electromagnet, fluid can pass from the valve inlet chamber 133 to the outlet 128. The inlet chambers 133 and 134 of the valves 130 and 129 are interconnected by a horizontal passage 135, from the middle of which branches a passage 136 which communicates, at the upper end of its extension 137 in base 11, with the main pressure-fluid supply passage 18. If the electromagnetic valve 129 is energized, the resultant subjection of piston 111 to the pressure fluid rocks lever 60 counter-clockwise (through the medium of pin 117) thereby opening the left-hand pair of valve closures 24 and 35; the strain-release spring 103 permitting the elevation of the left-hand end of lever 71 necessary for this movement. In a like manner, if valve 130 is energized, lever 60 is rocked clockwise and the other pair of valve closures 23 and 36 are opened; the resultant movement of lever 71 being in a direction away from the pins 74 and 75.

For sealingly interconnecting the ends of the passages 123, 125, 124, 126, and 137, 136, in base 11 and sub-base 12 respectively, these pairs of passages are enlarged at their junctions at the interconnecting surfaces of the bases to receive bushings 145, 146 and 147, respectively. The material of the base surfaces around each of the passages is recessed to provide, with the bushings, confining spaces for annular packing members 148, 149, and 150, of rubber or other deformable material, which, when the bases are bolted together (with a gasket 151 therebetween), are compressed and thereby seal the connections. Also formed in the interconnecting surfaces of the bases, surrounding but spaced from the passage connections, is an elongated cavity 152 which is connected by a vent passage 153 in base 11 with the outlet chamber 49 thereabove. In the event of leakage around the passage connections, only the small areas of the base surfaces surrounding the connections are subjected to the pressure of the fluid, which then passes harmlessly to the outlet. If such vent means were not provided, it would be necessary that the means for holding the bases together should be of such strength that they could withstand the pressure of the escaping fluid acting across the whole surface areas of the bases.

*Operation*

In Fig. 7, the valve illustrated in Figs. 1–6 is shown connected to control the operation of a fluid pressure motor 154 which comprises a cylinder 155 having a piston 156 reciprocable therein. A fluid pressure generating system for the motor is schematically shown as comprising a continuously operating pump 157 for delivering, from a reservoir or sump 158, liquid (such as the oil commonly employed in airplane hydraulic systems) under pressure to the valve inlet 13 through a pipe 13'; the outlet 16 of the valve being returned to the reservoir by a pipe 16'. The valve openings 14 and 15 are respectively connected by pipes 14' and 15' to the chambers 159 and 160 of the motor 154 at opposite sides of its piston 156. Extending from piston 156 is a stem 161 which is adapted to be connected to the means to be positioned in accordance with the temperature at the thermostatic unit 91, 95. When the valve is employed to control the temperature of the cooling liquid of an airplane engine (such being an important application of the valve of this invention), the stem 161 may be connected to operate the flaps or vanes which must be positioned to control air flow to the liquid tank or radiator. The stem 161 is also connected, by a link 162, to an arm 163 secured to the outer end of the stop screw 77.

In the diagram of Fig. 8, the parts have been assigned numerals corresponding to those of the equivalent parts of the structure shown in the other figures. For the sake of clarity, some of the parts have been considerably modified; for instance, in the diagram the connection between the stop pin 74 and the valve stem 161 comprises a bell-crank, whereas in the structure the pin is positioned by the rotation of screw 77 by the valve stem through link 162 and arm 163. However, it is believed that the general correspondence of the parts of the diagram and of the structure will be quite clear to those skilled in the art.

In the diagram, the lever 60 (which includes the valve-actuating end portions 63 and 64, and the portion 69 therebetween) is shown in its neutral position wherein all the valve closures 23, 36, 35 and 24 are unactuated, and hence held closed by their biasing springs; the thermostatic unit 95 being at the desired temperature which (assuming that the valve is connected in an airplane engine temperature control system of the character described above) is maintained in the cooling liquid, under existing conditions, by the air flaps being in partly open position, as is indicated by the medial position of the piston 156 in its cylinder.

If the temperature of the thermal unit now rises, the resultant downward movement of the bellows stem 100 tends to rock lever 71 counterclockwise; however, since free movement of this lever is restrained by the stop pin 74, it rocks rather about the stop pin as a fulcrum, thereby effecting clockwise rotation of lever 60, through its pivotal connection therewith. (It should be remembered that the strain-release spring 103 does not yield during the normal or automatic operation of the valve.) The resultant opening of the right-hand pair of closures 23, 36 permits flow of pressure fluid past closure 23, through passage 29 and pipe 15', to the motor chamber 160; the fluid in the other chamber 159 simultaneously discharging through pipe 14', passage 30, and around the open closure 36—the exhaust fluid then passing through the main chamber 49 of the valve and returning to the reservoir 158 through the pipe 16'; these elements not being shown in the diagram. The resultant right-hand movement of the piston effects wider opening of the flaps, and also acts through the members 163 and 77 to raise the stop pin 74, thereby permitting lever 60 to return to its neutral position under the influence of spring 110 (lever 71 now being effectively fulcrumed on pin 75) so that movement of the motor piston is arrested; lever 71 assuming a different angular position with respect to lever 60 due to the elevation of the stop pin 74.

Should the temperature of the thermal unit now decrease, the resultant rise of pin 75 permits lever 60 to rock counterclockwise under the influence of spring 110, thereby opening the other pair of valve closures 35, 24. This results in the application of pressure fluid to motor chamber 159 and the exhausting of chamber 160, so that the piston now moves in an opposite direction; its movement again being arrested due to the "follow-up" connection between the piston and the lever system which acts to restore lever 60 to its neutral position; the new angular position of lever 71 being determined by the positions of pins 74 and 75. It is to be understood, of course, that the piston can move continuously to the limit of its travel in either direction if the prevailing temperature conditions are such that it should; the stop or follow-up pin 74 then moving substantially in accordance with the movement of pin 75.

While I have herein shown and described, by way of illustration, specific embodiments of my invention, I wish it to be understood that modifications may be made without departing from the spirit of the invention, and that I intend therefore to be limited only by the scope of the appended claims.

I claim as my invention:

1. In a device that responds to variations in temperature of a body of fluid by immersion therein: an elongated hollow metallic cylinder having a pair of spaced external flanges; a metallic sleeve disposed over said flanges and sealed thereto to form with said cylinder an annular chamber; said flanges forming the ends of said chamber; a temperature-responsive fluid in the chamber; there being an aperture through one of said flanges forming a passage for said temperature-responsive fluid; a supporting base for said device; said cylinder being extended beyond said one of the flanges and attached at its end to said base; the portion of the cylinder between said base and said one of the flanges having openings therethrough to permit flow, through the interior of the cylinder, of said fluid wherein the device is immersed, and also to reduce transfer of heat between the device and the base, the total area of said openings being of the same order as the cross-sectional area of the interior of the cylinder; and means in thermal contact with the temperature-responsive fluid in the chamber and defining with the cylinder and the sleeve a tortuous narrow passageway for the temperature-responsive fluid from one end of the chamber to the other, said means being composed of relatively thin metal having good heat-conducting property.

2. A temperature-responsive device, as defined in claim 1, wherein said means, in thermal contact with the temperature-responsive fluid in the chamber, consists of a plurality of thin metallic fins spaced longitudinally of the chamber and dividing the same into a plurality of fluidly-interconnected compartments.

WILLIAM A. RAY.